Patented Feb. 6, 1951

2,540,476

UNITED STATES PATENT OFFICE 2,540,476

METHOD OF SEPARATING DIHALOGENO-PYRAZINES

James K. Dixon, Riverside, Conn., and Alexander A. Miller, Madison, Wis., assignors to American Cyanamid Company, New York, N. Y., a corporation of Maine No Drawing. Application May 8, 1948, Serial No. 25,985

2 Claims. (Cl. 260—250)

This invention relates to the isomeric dihalogenopyrazines and to a novel process of preparing and isolating these compounds in the pure state. More particularly, it relates to the halogenation of pyrazines at elevated temperatures and in the vapor phase to produce the mixture of isomeric dihalogenated pyrazines and to the separation of 2,3-, 2,6- and 2,5-dihalogenopyrazines therefrom.

In the present specification the term "pyrazines" is used to include only pyrazine per se, and "halogenopyrazines" derived therefrom. "Halogenopyrazines" is used to designate such "pyrazines," chlorine or bromine substituted on a ring carbon only. Such compounds as the three isomeric dichloro and dibromopyrazines, tribromopyrazine and tetrachloropyrazine are obtained in accordance with the present invention. Many of these are believed to be new compounds.

In the past there has been available but little information on pure halogenopyrazines. Pyrazine, not only as a solid but when melted or dissolved in solution, is violently attacked by pure halogens such as chlorine or bromine. Deterioration is so rapid that it is impossible to ascertain whether halogenation originally occurred or not. As a result it was generally postulated that the pyrazine ring was too unstable for direct halogen substitution.

It was subsequently found by Winnek, U. S. Patent 2,396,066, that by the use of a suitable catalyst this generality could be modified with respect to pyrazine in the vapor phase. However, instead of obtaining the expected mixture of mono- and polychloropyrazines, Winnek found that he obtained substantially pure monochloropyrazine. Subsequently Sayward, U. S. Patent 2,391,745, found that under suitable reaction conditions the catalyst could be dispensed with but that again only the mono-substituted pyrazine was produced in appreciable quantities.

Polyhalogenopyrazines, however, have shown promising utility in many varied fields. These include, for example, the production of insecticides, detergents, synthetic fibers and ionic resins. As a result, interest in methods of producing such compounds adaptable for use on a commercial scale has been rapidly increasing. There is a marked demand for such a process.

In the copending application of Dixon, Miller and Bruesch for U. S. Letters Patent, Serial No. 25,986, filed of even date, it has been shown that polyhalogenopyrazines can be produced in the vapor phase by direct halogenation of pyrazine. In the copending application of A. A. Miller, one of the present inventors, Serial No. 25,987 also filed of even date, it has been shown that similar products can be made from a monohalogenopyrazine. In both of these applications the products are obtained as a mixture of mono- and polyhalogenopyrazines. Where the halogen is bromine, no tetrabromopyrazine appears to be formed even at very high temperatures. In case of chloropyrazines, tetrachloropyrazine tends to form rather than the trichloropyrazine.

Both dichloro and dibromopyrazine have been previously prepared by indirect methods. It is with these compounds that the present invention is particularly concerned. In carrying out a reaction such as the direct vapor phase polyhalogenation of pyrazine or halogenopyrazine of the previously noted specifications, a reacted mixture is obtained which is condensed and the condensate separated into components by distillation. In so doing a product is obtained which does not agree with the previously accredited properties of either dichloro or dibromopyrazine even though both were previously prepared in what was reported to be a pure state.

It is theoretically possible to postulate three isomeric dihalogenopyrazines, namely, the 2,3-, the 2,5- and 2,6-. It is desirable to determine whether the vapor phase halogenation product constitutes a different material from those previously discussed in the art. It is, therefore, the principal object of the present invention to separate the mixture of dihalogenopyrazines obtained by a direct, vapor-phase halogenation into three component isomers and to identify the isomers so obtained.

The objects of the present invention are accomplished by a process broadly involving a combination of fractional distillation and crystallization. The product mixture is separated by fractional distillation at reduced pressure. Two distillate fractions, corresponding to definite breaks in the distillation curve, are obtained. The higher boiling fraction appears to comprise the 2,3-dichloropyrazine.

The lower boiling fraction is then subjected to low temperatures of from about minus 5° to about plus 5° C. In this treatment two fractions are obtained, one melting at a much lower temperature than the other. The lower melting fraction proved to be the 2,5-isomer. The residue contained the 2,6-isomer.

The higher boiling fraction is treated by solution with any of the commercially used hydrocarbon solvents and crystallization to obtain a pure product. The residue from the freezing treatment is subjected to the same type of purification.

In performing the separation, some monohalogenopyrazine is usually found in the product. This is distilled off first. The temperatures will depend upon the pressures used. A reduced pressure of from about 20–75 mm. is found satisfactory although this may be varied in accordance with the capacity of the apparatus which must be used. The amount of reflux used in the fractional distillation may be considerably varied. A 1:1 reflux is found to produce perfectly acceptable results. Increasing this ratio to as high as 1:9 does not appreciably improve the results.

Separation of the three dichloropyrazine isomers is typical of the present process and is illustrated in the following example. In this example the halogenation procedure is set forth in order to show the source of the mixture being treated. All parts are by weight unless otherwise noted.

EXAMPLE 1

Pyrazine, as a 55% aqueous solution, was continuously vaporized and admixed with chlorine gas. Feed rates were proposed to provide a total of two mols of chlorine gas per mol of pyrazine. The pyrazine vapors and the chlorine gas were preheated to about 250° C., admixed in a 6 tube conversion chamber, and held therein at the reaction temperature of about 350° C. for a total of about 15 seconds. The chlorine flow was divided, one-half being fed at the inlet to the conversion chamber and one-half at a point beyond that at which the temperature had risen to 450° C. About 11 seconds contact time was used in the first zone and about 4 to 5 seconds in the second zone. The reacted products were subjected to condensation. The condensate was neutralized with about 25% aqueous caustic soda and steam distilled. The steam distillate separated out a heavy oil. The oil was removed, the aqueous fraction extracted with benzene, the benzene extract and oil combined, and the benzene water azeotrope stripped therefrom at atmospheric conditions. The temperature was then raised and the fraction boiling at 152–154° C. removed. This constituted substantially the monochloropyrazine product.

Residue from the procedure noted above was subjected to fractional distillation in a 34 plate Stedman column at 46 mm. About 27% of the charge distilled as monochloropyrazine at about 70° ± 3° C. A second fraction boiling at 92° C. was taken and a third fraction boiling at 102° C. The 102° C. boiling fraction was substantially pure and solidified at about 24° C. at normal atmospheric pressure. This solid proved to have a melting point of 22°–24° C. and provided by examination of dipole moment data to be 2,3-dichloropyrazine.

The lower boiling fraction was filtered successively at 10° C., 0° C., minus 2° C., minus 5° C., and minus 5° C. The crystals obtained in each of the minus 5° C. crystallizations melted below room temperature and the refractive index of the melt was the same as that of the filtrate, $N_D^{25}=1.5590$. The fraction appears to have a melting point between minus 1° C. and 0° C. Examination of the infra red characteristics indicate it to be the 2,5-dichloropyrazine. The residue obtained in the several crystallizations was combined and recrystallized from methanol. This gave a solid of constant melting point of 53°–54° C. which was identified by infra red as a 2,6-dichloropyrazine isomer. The proportions between the isomers proved to be about 45% 2,6-, 24% 2,3- and 31% 2,5-.

EXAMPLE 2

Liquid bromine was continuously fed to a vaporizer at the uniform rate of feed of 0.017 mol per minute. A 55% solution of pyrazine in water was fed at 0.012 mol of pyrazine per minute to a separate vaporizer. The vaporized mixture of water and pyrazine was preheated to approximately 250° C., then mixed with about half of the bromine vapor at approximately the same temperature and the mixture heated to approximately 400° C. and fed to the converter. The remaining bromine, preheated to about 400° C. was introduced into the converter at about the midpoint in the reaction zone. The total contact time of the vapors in the converter amounted to 2.2 seconds.

The product issuing from the converter were condensed and the products collected. The condensate, consisting essentially of a water solution of unconverted pyrazine, hydrobromic acid and an oil layer made up of bromopyrazines, was diluted with water, neutralized with sodium carbonate to a pH of 7–8, and the neutralized solution steam distilled. The steam distillate separated into layers, a water layer containing most of the unconverted pyrazine, and an oil layer consisting principally of the bromopyrazines.

The unconverted pyrazine was determined in the water layer of the steam distillate as its insoluble mercuric chloride salt. The total bromopyrazines formed were obtained from the weight of the oil layer. The oil layer was subsequently distilled in order to determine the amount of mono-, di- and tribromopyrazines. Runs were repeated at differing temperatures, contact times and halogen-pyrazine ratios. Illustrative results are shown in the following table:

TABLE I

*Vapor phase bromination of pyrazine*

| Run | 1 | 2 | 3 | 4 | 5 | 6 | 7 | 8 |
|---|---|---|---|---|---|---|---|---|
| Converter Temp., °C | 410 | 460 | 515 | 370 | 505 | 480 | 530 | 575 |
| Contact Time, seconds | 2.2 | 2.1 | 2.0 | 2.4 | 1.8 | 6.5 | 1.8 | 2.4 |
| Bromine Rate, mols/min | 0.017 | 0.013 | 0.013 | 0.013 | 0.021 | 0.006 | 0.022 | 0.022 |
| Pyrazine Rate, mols/min | 0.012 | 0.011 | 0.012 | 0.012 | 0.012 | 0.003 | 0.011 | 0.010 |
| Pyrazine Input, mols | 0.54 | 0.74 | 0.52 | 0.61 | 0.54 | 1.39 | 2.66 | 1.74 |
| Pyrazine Recovered, mols | | 0.31 | 0.10 | 0.38 | 0.05 | 0.20 | 0.36 | 0.25 |
| Pyrazine Conversion, percent | | 58 | 79 | 38 | 92 | 86 | 87 | 86 |
| Oil Layer, g | 1–2 | 28 | 48 | 0 | 67 | 120 | 330 | 235 |

Table I—Continued

*Distillation of oil layers*

[Yields based on pyrazine used up.]

| Run | [1]1 | 2 | 3 | [2]4 | 5 | 6 | 7 | 8 |
|---|---|---|---|---|---|---|---|---|
| | | Distilled Together | | | | Distilled Together | | |
| Monobromopyrazine, Percent Yield | | 43 | | | 36 | 23 | | 7 |
| Dibromopyrazine, Percent Yield | | 12 | | | 27 | 35 | | 38 |
| Tribromopyrazine, Percent Yield | | 0.5 | | | 1.3 | 1.2 | | 17 |

[1] Low yield } too low reaction temperature.
[2] No yield

Identification of bromopyrazines

The products from runs 6 and 7 were combined for distillation. Three main fractions were obtained: (1) 118 g. liq. B. P. 61–64° C. at 9–10 mm., $N_D^{25}$ 1.575–1.578, this was shown to be monobromopyrazine; (2) 287 g. liq. + solid, B. P. 86–89° C. at 4–5 mm., this was shown to be a mixture of the three isomeric dibromopyrazines; (3) a residue of 24 g. which was distilled, B. P. 87–88° C. at 1 mm., this was shown to be composed of tribromopyrazine 80% and dibromopyrazine 20%.

As in Example 1 distillation followed by fractional crystallization of the second fraction from that distillation, the combined products of runs 6 and 7 were separated into the three isomeric dibromopyrazines. Identification of the three isomeric dibromopyrazines and tribromopyrazine was based on microchemical nitrogen analyses, infra-red spectra, and dipole moment measurements. Tribromopyrazine, 95% pure by infra-red analysis, melted at 40°–44° C.

Table II

*Comparison of dichloro and dibromopyrazines*

| Isomer | Dibromo-Source | M. P., °C. | Dichloro-Source | M. P., °C. |
|---|---|---|---|---|
| 2,6 | Solid obtained from first dibromopyrazine fractions. | 49–52 | Solid obtained from first dichloropyrazine fractions. | 52–54 |
| 2,5 | Obtained by freezing out isomer from intermediate fractions. | 6.5–8 | Obtained by freezing out isomer from intermediate fractions. | 0 |
| 2,3 | Solid obtained from last fractions | 59–61 | Solid obtained from last fractions | 23–24 |
| | Residue-tribromopyrazine | | Residue-tetrachloropyrazine | |

Data are in agreement between dibromo- and dichloropyrazines except that order of melting points for the 2,3 and 2,6 isomers are reversed. Also, tribromopyrazine was found in place of tetrachloropyrazine.

We claim:

1. A method of isolating 2,6-, 2,5-, and 2,3-halogeno pyrazines, the halogen being selected from the group consisting of chlorine and bromine, the halogen being identical throughout, from mixtures thereof with the corresponding monohalogeno pyrazine, and higher substituted halogeno pyrazine, which comprises subjecting the mixture to fractional distillation at reduced pressure, whereby the mixture is separated into a low boiling monohalogenopyrazine fraction, an intermediate substantially constant boiling mixture, a higher substantially constant boiling product and residue; at reduced pressure separating the higher constant boiling fraction as the 2,3-dihalogenopyrazine isomer, subjecting the intermediate constant boiling fraction to fractional crystallization at from about minus 5° to plus 5° C., whereby a low melting and a high melting fraction is obtained, collecting said low melting fraction as the 2,5-dihalogenopyrazine isomer, and separating the 2,6-dihalogenopyrazine isomer from the higher melting fraction.

2. A method of isolating 2,6-, 2,5-, and 2,3-dibromo pyrazines from mixtures thereof with monobromo pyrazine and tribromo pyrazine, which comprises the steps of subjecting the residue to fractional distillation at reduced pressure, whereby the mixture is separated into a low boiling monobromopyrazine fraction, an intermediate substantially constant boiling product, a higher substantially constant boiling product and residue; at reduced pressure separating the higher constant boiling fraction as the 2,3-dibromopyrazine isomer; subjecting the intermediate constant boiling fraction to fractional crystallization at from about minus 5° to plus 5° C., whereby a low melting and a high melting fraction is obtained, collecting said low melting fraction as the 2,5-dibromopyrazine isomer, and separating the 2,6-dibromopyrazine isomer from the higher melting fraction.

JAMES K. DIXON.
ALEXANDER A. MILLER.

REFERENCES CITED

The following references are of record in the file of this patent:

Erickson et al., J. Am. Chem. Soc. 68 400–402 (1946).